Patented Mar. 26, 1935

1,995,952

UNITED STATES PATENT OFFICE 1,995,952

METHOD OF FINING GLASS AND BATCH THEREFOR

William C. Taylor, Corning, N. Y., assignor to Corning Glass Works, Corning, N. Y., a corporation of New York No Drawing. Application August 3, 1933, Serial No. 683,548

4 Claims. (Cl. 106—36.1)

This invention relates to methods of fining glass and has for its object to remove the bubbles from melts not only of ordinary oxidized glasses but also of reduced glasses with a minimum of expense.

One of the chief difficulties encountered in the manufacture of glass is the proper fining thereof. This is particularly true of reduced glasses such as heat absorbing glasses which contain ferrous iron. The most satisfactory means of fining oxidized glasses heretofore has been the use of arsenic with niter. Salt cake is a common fining agent in lime glasses. In some types of glasses arsenic is unsatisfactory or objectionable. (1) It is useless in reduced glasses since it requires the presence of niter or some other oxidizing agent in the batch. (2) Glasses containing arsenic tend to discolor in sunlight. (3) Some glasses containing arsenic discolor when worked in the flame. (4) Arsenic causes objectionable bubbling in some lamp glasses when these are worked in the flame. (5) Arsenic is also objectionable in laboratory glassware which is to be used for the analytical determination of traces of arsenic.

I have discovered that the elements of the sulfur subgroup of the sixth periodic group having an atomic weight between 32 and 128, consisting specifically of sulfur, selenium, and tellurium, are efficient fining agents in all kinds of glasses, both oxidized and reduced. Sulfur has a stronger fining action than selenium or tellurium and selenium is somewhat stronger in action than tellurium. In general, selenium and tellurium impart a slight color to glass and except when used in very small amounts these elements are not as desirable as sulfur which with the following exception does not cause appreciable coloration. In reduced glasses which contain considerable iron such as heat absorbing glasses only sulfur and selenium cause appreciable discoloration, probably due to the formation of sulfides and selenides of iron, while tellurium in this case does not cause discoloration. Hence, tellurium is particularly suitable for fining heat absorbing glasses.

In practicing my invention I add to the glass batch from a few hundredth to a few tenths per cent of the fining agent calculated on the basis of the finished glass and melt the batch in the usual manner. Since sulfur is the most volatile of the above recited elements and does not of itself color the glass appreciably this element may be used in larger amounts than the others and I have successfully employed as high as about two per cent of it.

I am aware that sulfur has been used for coloring glass when employed in conjunction with coloring agents such as cadmium sulfide but insofar as I know sulfur has not been used in glass without the addition of coloring agents for the purpose of fining the glass. Furthermore, selenium has been used both alone and in conjunction with other coloring agents for the purpose of coloring glass but insofar as I know selenium has not been used alone in amounts insufficient to cause appreciable coloration for the purpose of fining the glass.

In some types of glass, such as for example low expansion borosilicates which are difficult to fine I have found that the addition of salt cake together with the sulfur causes a higher degree of fining than can be obtained with either salt cake or sulfur alone.

The following batches and examples of my invention illustrate the use of sulfur, selenium, and tellurium as fining agents in various kinds of glasses.

|  | A | B | C | D | E | F | G |
|---|---|---|---|---|---|---|---|
| Sand | 388 | 388 | 388 | 388 | 360 | 305 | 405 |
| Borax | 53 | 131 | 131 | 122 |  |  |  |
| Boric acid | 77 | 26 | 26 | 32 |  |  |  |
| Alumina hydrate | 12 | 12 | 12 | 12 |  |  | 8 |
| Niter | 28 |  |  |  |  | 25 |  |
| Soda ash |  |  |  |  | 150 | 127 | 19 |
| Felspar |  |  |  |  | 24 |  |  |
| Dolomite |  |  |  |  | 56 |  |  |
| Calcium hydrate |  |  |  |  |  | 35 | 14 |
| Zinc oxide |  |  |  |  |  |  | 33 |
| Iron scale |  |  |  |  |  |  | 3 |
| Starch |  |  |  |  |  |  | 1 |
| Sulfur | 2 | 2 | 8 | 3 | 2 |  |  |
| Selenium |  |  |  |  |  | 1 |  |
| Tellurium |  |  |  |  |  |  | 1 |
| Salt cake |  |  |  | 3 |  |  |  |

Batch A is an example of a borosilicate containing an oxidizing agent in the form of niter and also containing about 0.4% of sulfur as a fining agent.

Batches B and C are borosilicates without oxidizing agents and also containing sulfur as fining agent, C containing almost two per cent of sulfur.

Batch D is a borosilicate without oxidizing agents and contains both sulfur and salt cake as fining agent.

Batch E is a soda lime glass without oxidizing agents and contains sulfur as fining agent.

Batch F is a soda lime glass without oxidizing agents and contains about 0.02% selenium as fining agent.

Batch G is a heat absorbing borosilicate containing iron and reducing agent and also containing tellurium as fining agent.

The above batches when melted in the usual manner yield glasses which are practically entirely free from bubbles and the various fining agents may be substituted one for the other in their respective proper amounts in the different batches with practically the same results. In Batch G the substitution of sulfur or selenium for tellurium, although it will cause fining, will also cause some discoloration as pointed out above and hence is not as desirable as the other substitutions.

What I claim is:

1. The method of fining glass which includes adding to the batch not over 2% of sulfur and salt cake and melting the batch.

2. A batch for a substantially colorless and seedless glass which contains not over 2% of sulfur and salt cake and no other coloring agent.

3. The method of fining glass which includes adding to the batch substantially equal parts of sulfur and salt cake the sulfur amounting to not over one per cent of the finished glass, and melting the batch.

4. A batch for a substantially colorless and seedless glass, which contains substantially equal parts of sulfur and salt cake, the sulfur amounting to not over 1% of the finished glass and no other coloring agent.

WILLIAM C. TAYLOR.